United States Patent
Yoshimatsu (10) Patent No.: US 6,989,640 B2
(45) Date of Patent: Jan. 24, 2006

(54) ACTUATOR DRIVING DEVICE OF WORKING MACHINE

(75) Inventor: Hideaki Yoshimatsu, Hyogo (JP)

(73) Assignee: Kobelco Construction Machinery Co., Ltd., Hiroshima (JP)

( * ) Notice: Subject to any disclaimer, the term of this patent is extended or adjusted under 35 U.S.C. 154(b) by 0 days.

(21) Appl. No.: 10/495,421

(22) PCT Filed: Nov. 19, 2002

(86) PCT No.: PCT/JP02/12046

§ 371 (c)(1),
(2), (4) Date: May 20, 2004

(87) PCT Pub. No.: WO03/044940

PCT Pub. Date: May 30, 2003

(65) Prior Publication Data
US 2005/0001567 A1    Jan. 6, 2005

(30) Foreign Application Priority Data
Nov. 21, 2001   (JP)   ............................. 2001-356159

(51) Int. Cl.
    *H02P 1/54*        (2006.01)
(52) U.S. Cl. .................. 318/34; 318/140; 318/147
(58) Field of Classification Search .................. 318/34, 318/140, 147, 376, 370, 382, 139; 60/422; 290/40
See application file for complete search history.

(56) References Cited

U.S. PATENT DOCUMENTS

2002/0096886 A1 * 7/2002 Schmitz et al. ........... 290/40 C
2003/0140626 A1 * 7/2003 Schenk et al. ................. 60/422

FOREIGN PATENT DOCUMENTS

| JP | 3-74582 | 3/1991 |
|----|---------|--------|
| JP | 10-112996 | 4/1998 |
| JP | 2001-002371 | 1/2001 |

* cited by examiner

*Primary Examiner*—Karen Masih
(74) *Attorney, Agent, or Firm*—Oblon, Spivak, McClelland, Maier & Neustadt, P.C.

(57) ABSTRACT

A device, mounted on a hydraulic excavator, for allowing each of first and second electric motors (13), (14) to generate power by using electric power supplied from a power supply having a predetermined capacity, and actuating a boom cylinder (6), an arm cylinder (7), etc. using the generated power. Electric motor controllers (24), (25), respectively control power that is generated by the electric motors (13), (14) so that, in machine-operation, powers generated by the electric motors (13), (14) may be equal to or less than predetermined rated outputs, and the total amount of powers generated simultaneously by the electric motors (13), (14) correspond to the maximum capacity of the power supply.

10 Claims, 11 Drawing Sheets

ACTUATOR DRIVING DEVICE OF WORKING MACHINE

TECHNICAL FIELD

The present invention relates to an actuator driving device for actuating actuators by electric motors mounted on a working machine, such as a hydraulic excavator, a mobile crane, or the like.

BACKGROUND ART

In recent years, to meet a requirement of energy saving, various types of so-called hybrid working machines have been developed that have a prime motor and a power generator mounted thereon as a power system of a working machine such as a hydraulic excavator, or the like. This hybrid working machine is capable of mounting thereon a motor-operated or a motor-operated hydraulic actuator driving device having, for example, the following structure.

The motor-operated actuator driving device is operable to drive an actuator directly by an electric motor, or via a reduction mechanism, wherein a operation direction of the actuator is controlled by a rotation direction of the electric motor, and a speed of operation of the actuator is controlled by a revolving speed of the electric motor.

The motor-operated hydraulic actuator driving device is operable to drive a hydraulic pump by rotating the electric motor, which hydraulic pump drives the actuator. Where, a discharge direction of the hydraulic pump is controlled by the rotation direction of the electric motor, and an amount of discharge from the pump is controlled by the revolving speed thereof, so that the operation direction and speed of the actuator is controlled (as disclosed in Japanese Patent Unexamined Publication No. 2001-2371).

In an AC servo motor, an operable area in the case of continuous use or repeated use, depending on working time of the electric motor, is defined by a relationship between a revolving speed of the electric motor and torque. thereof. Otherwise, available working time of the servo motor is defined according to torque of the electric motor or load ratio thereof. This is based on limits due to a raise in temperature of the electric motor and a controller. Thus, when a prescribed work is intended to be carried out by the motor-operated actuator device, the electric motor should have a larger size, and its power supply capacity be increased, leading to higher manufacturing costs.

Then, downsizing of the electric motor or power supply capacity results in low manufacturing costs, but restricts available continuous working time. Since, especially in a hydraulic excavator, a mobile crane, or the like, a space to set therein devices is strictly limited, devices such as an electric motor, a controller, a power supply, or the like may be preferably as small as possible. However, in cases where the devices have usable conditions thereof strictly restricted, they are difficult to handle. Accordingly, the problem encountered with the related art is that both requirements concerning the size of device and the length of working time thereof are not compatible with each other at the same time. On the other hand, the motor-operated hydraulic actuator driving device is supposed to have the same problems.

DISCLOSURE OF THE INVENTION

The present invention is to solve the foregoing problem, and it is an object of the present invention to provide an actuator driving device of a working machine capable of prolonging the time of use, with high thrust and high torque without any increase in size of an electric motor and a power supply capacity.

According to one aspect of the invention, there is provided an actuator driving device which is mounted on the working machine, for allowing electric motors to generate power by using electric power supplied from a power supply with a predetermined capacity, and for operating actuators by the generated power, wherein the device comprises a controller for controlling the power generated from each of the electric motors so that, during operation of the working machine, the power generated from each of the electric motors is equal to or less than a predetermined rated output, and that a total amount of power simultaneously generated by the electric motors corresponds to a maximum capacity of the power supply. It should be noted that the predetermined rated output includes output corresponding to effective torque, for example.

According to this arrangement, during operation of the working machine, the power generated by each of the electric motors is controlled by the controller in such a manner that the power generated from each of the electric motors is equal to or less than the predetermined rated output, and that the total amount of power simultaneously generated by the electric motors corresponds to the maximum capacity of the power supply. The total amount of power generated by the electric motors is defined by the maximum capacity of the power supply, thereby avoiding consumption of excessive power with respect to combination of respective peaks of the power for the motors. Especially, in the hybrid system working machine, the capacity of a power source of the machine is stabilized, whereby power fluctuations are reduced. Even when downsizing each of the electric motors, power is distributed among the motors in balance within the maximum capacity of the power supply, preventing excessive loads on the electric motors, thus avoiding an unexpected stop of the electric motors, and a waste of power. In addition, the maximum capacity of the power supply of the working machine is predefined, whereby there is no need to prepare an excessive power supply, to permit saving of power supply costs and a space to accommodate the power supply therein.

According to the invention, the controller allows one of the electric motors to generate a predetermined power, and to control the power generated from the other electric motor within a remaining capacity obtained by subtracting the predetermined power from the maximum capacity of the power supply. Even when one electric motor whose output is predefined is given a high priority, good control of the power generated from the other electric motor is obtained.

According to the invention, the controller respectively controls the power generated from each of the electric motors so that, in multiple operation of the actuators to be driven, all the actuators to be operable are actuated. Thus, even in the multiple operation good control of the power generated from the respective electric motors is obtained.

According to claim 5 of the invention, the working machine is of a self-traveling type, and the power supply is mounted on this working machine. This has the big advantage that, even when mounting the power supply on the self-traveling machine with its weight and a setting space to accommodate devices strictly limited, an area for working in the working machine is enlarged.

According to the invention, at least one of the electric motors drives the hydraulic pump, which drives at least one of the actuators. This makes it possible to work with high thrust and high torque using the actuator.

According to the invention, the hydraulic pump is in the form of variable capacity, and the controller controls the power generated by the motors by restricting a revolving speed of each of the electric motors in accordance with output torque of the electric motors, while controlling driving torque of the hydraulic pump by reducing an amount of discharge from the hydraulic pump with respect to discharge pressure of the hydraulic pump so that the power of each of the electric motors does not exceed at least its maximum power. Even if the electric motor has constant output, the hydraulic pump can ensure required discharge pressure, so that loads on the motors are reduced, thereby achieving energy saving. The output torque of the electric motor is set to a small value, permitting downsizing of the electric motor with a small electric current. The use of such a downsized electric motor with a relatively high load ratio is more effective than that of a large-sized motor with a low load ratio. When one or more actuators driven by the hydraulic pump and remaining actuators directly driven by the electric motors perform multiple operation, widening of limits of output from the electric motors without changing limits of driving torque of the hydraulic pump, with torque restriction carried out by the hydraulic pump, decreases output from the electric motor, and permits use of the motors under a continuous rated condition. Thus, even when the pump discharge pressure is high, available continuous working time is not restricted.

BEST MODE FOR CARRYING OUT THE INVENTION

Embodiments of the present invention will be described hereinafter in detail by taking a hydraulic excavator as an example of a working machine with reference to accompanying drawings.

(a) Embodiment 1

Figure 1:
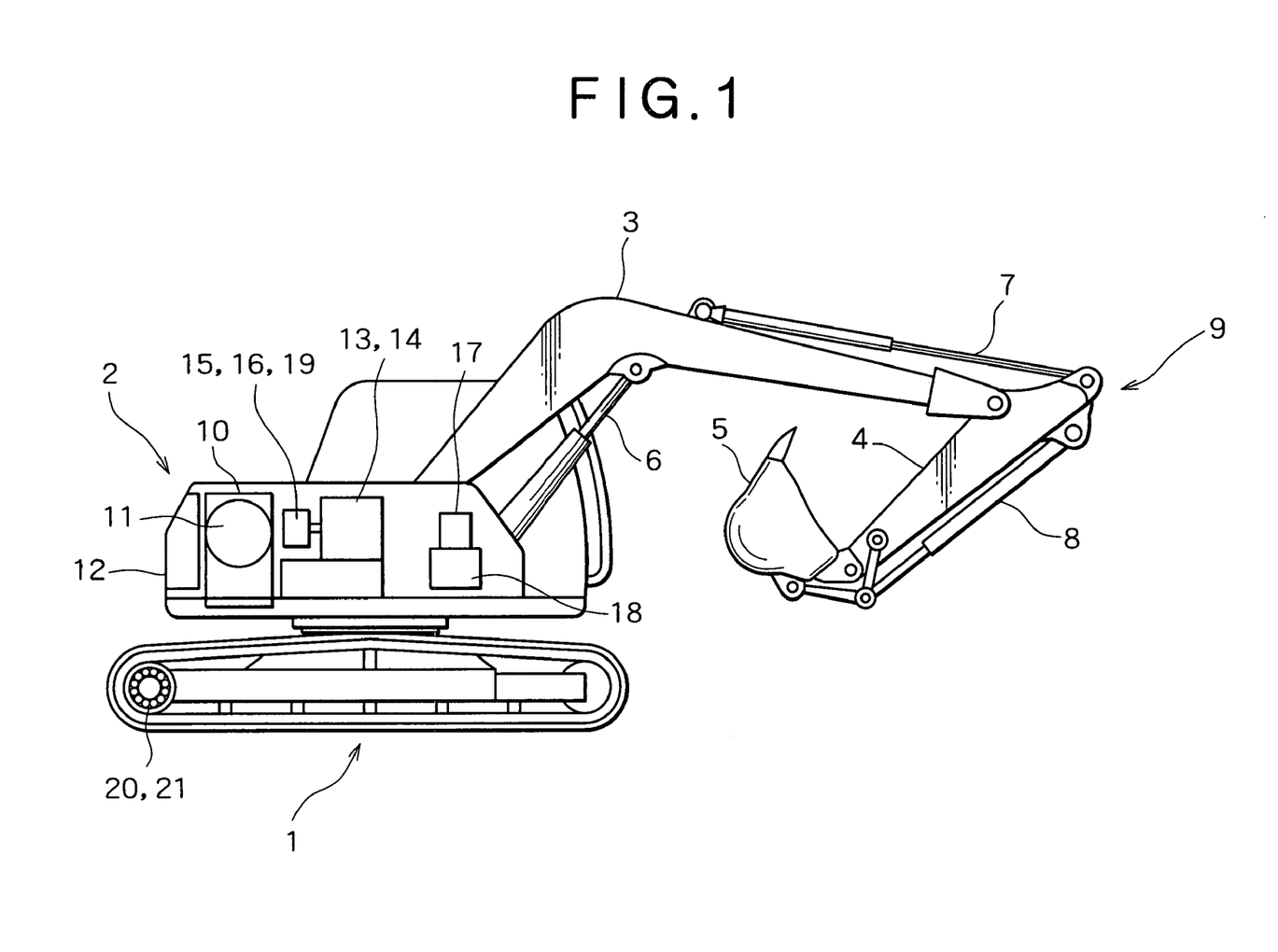
FIG. 1 is a diagram showing an entire configuration of a hydraulic excavator.

FIG. 1 shows the entire configuration of a hydraulic excavator. In the figure, on a crawler type lower traveling body 1 is rotatably mounted an upper traveling body 2. In front of the upper rotating body 2 is mounted an excavating attachment 9 which includes a boom 3, an arm 4, a bucket 5, a boom cylinder for boom rising/falling 6, an arm cylinder for arm operating 7, and a bucket cylinder for bucket operating 8.

In the upper rotating body 2 are disposed an engine 10 as a power source, a power generator 11 driven by this engine 10, a battery 12, two electric motors, i.e., a first electric motor 13 and a second electric motor 14 (one of which is shown in the figure, and which are denoted at M1 and M2 in FIG. 2), and first and second hydraulic pumps 15 and 16 (one of which is shown in the figure, and which are denoted at P1 and P2) individually driven by both electric motors 13 and 14. Further, in the rotating body 2 are disposed an electric motor for rotation 17 (which is shown in the figure, and denoted at M4), a reduction gear for rotation 18 as a decelerator for rotation that reduces a rotating force of the rotation motor to transmit a reduced rotating force to the upper rotating body 2 as a rotation force, and a control valve unit 19 that includes a plurality of control valves.

In the lower traveling body 1 are disposed hydraulic motors 20 and 21 (one of which is shown in the figure) for right and left traveling as a traveling drive source. Each of the cylinders 6, 7 and 8, the rotation motor 17, and the hydraulic motors 20 and 21 corresponds to an actuator, respectively.

Figure 2:
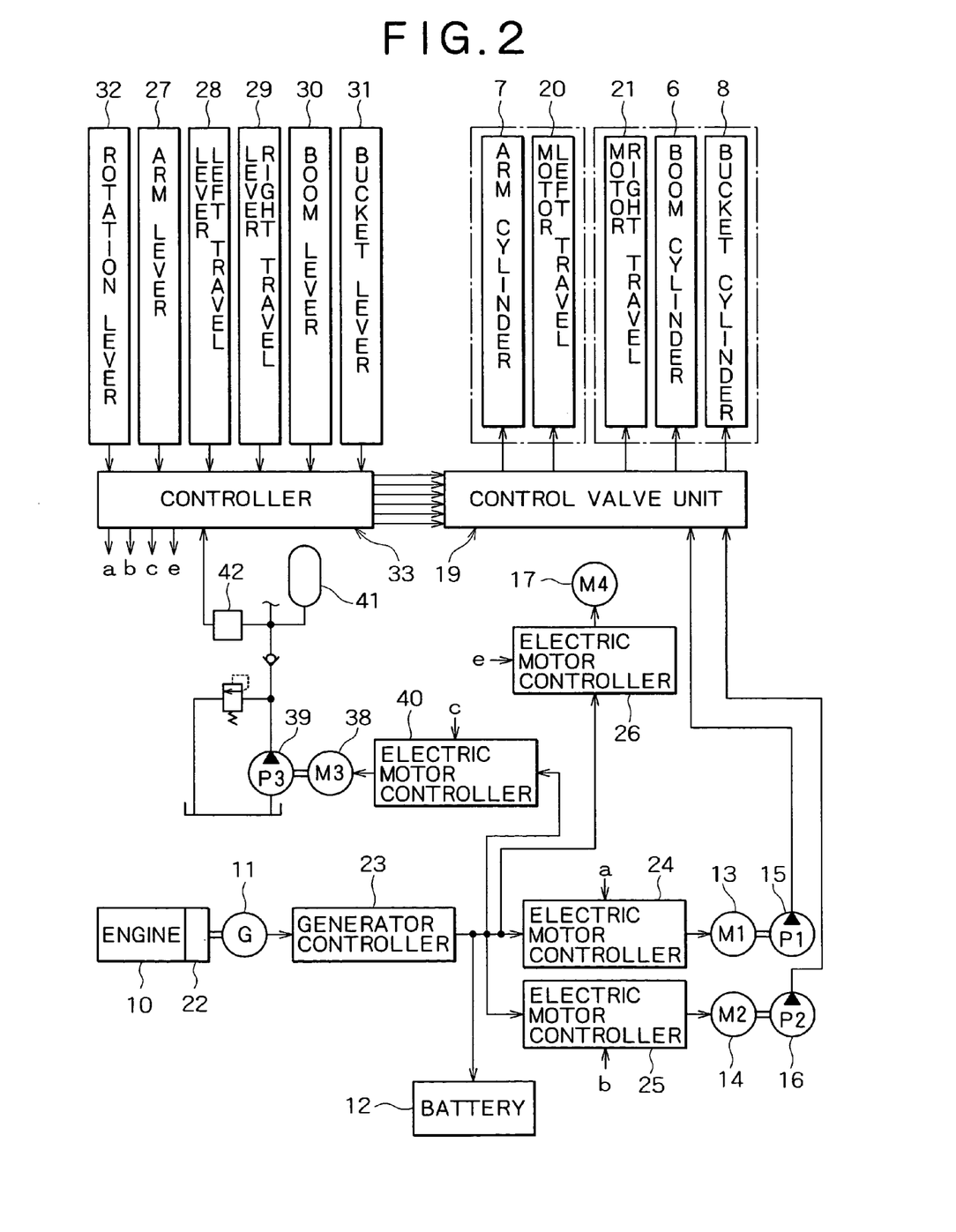
FIG. 2 is a block diagram showing the configuration of drive and control systems of the hydraulic excavator according to the first and third embodiments of the invention.

FIG. 2 shows the configuration of drive and control systems of the hydraulic excavator according to the first embodiment. As shown in FIG. 2, output from the engine 10 is transmitted to the power generator 11 via a speed-up mechanism 22 as an accelerator. Power generated by this power generator 11 is supplied or fed to the first and second electric motors 13 and 14 and the rotation motor 17 via a generator controller 23 and electric motor controllers (which correspond to controller) 24, 25 and 26, so that the electric motors 13, 14 and 17 are rotated. From among them, the first electric motor 13 and the second electric motor 14 drive the first hydraulic pump 15 and the second hydraulic pump 16, respectively.

It should be noted that the power generator 11 is operated at higher speed than the engine 10 using the above-mentioned speed-up mechanism (e.g., a planet gear mechanism is used) 22, thereby making it possible to downsize the power generator 11. Depending on the number of revolutions of the engine 10, a speed-up mechanism is not necessarily provided.

Some surplus power of electric power generated by the power generator 11 with respect to the power required in working is converted into direct-current power by the generator controller 23, which power is then stored in the battery 12. If necessary, the stored power in the battery 12 is used as an electric motor power supply.

Thus, in response to load fluctuations of the excavator, power is supplied or replenished from the battery 12, depending on whether an amount of generated power is insufficient or excessive, thereby averaging the output from the engine 10. As a result, the engine 10 is operated within effective driving levels with stability, leading to reduction in an amount of fuel consumed, thereby achieving energy saving.

As operating devices, an arm lever 27, a lever for left traveling 28, a lever for right traveling 29, a boom lever 30, a bucket lever 31, and a rotation lever 32 are disposed. By operating these levers 27 to 32, command signals corresponding to amount of respective lever operations (including a direction of operation, and which will be described hereinafter in a like manner) are output from operation amount/electric signal conversion means not shown (e.g., a potentiometer) towards a controller 33.

The controller 33 outputs operation signals to control valves (a valve unit 19 in FIG. 2) provided on the respective actuators, based on the above command signals, while sending revolution command signals a and b to the first and second electric motors 13 and 14 (electric motor controllers 24 and 25), and a revolution command signal e to the electric motor for rotation 17 (electric motor controller 26).

Figure 3:
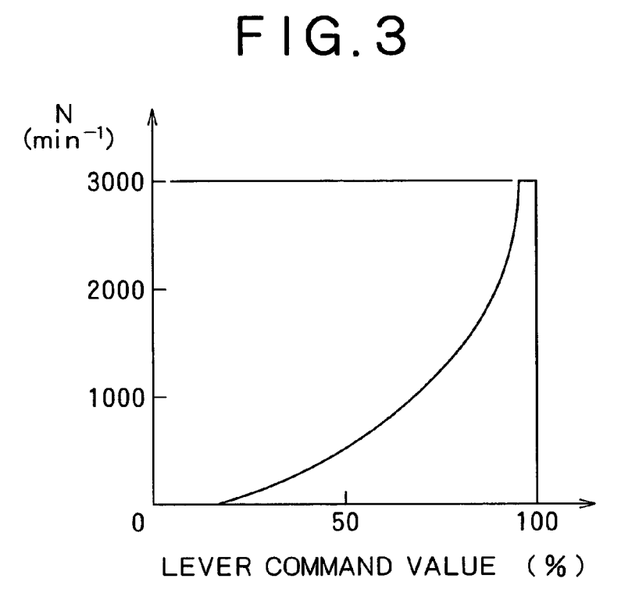
FIG. 3 is a diagram showing a relationship between a revolving speed of an electric motor and a lever command value.

FIG. 3 shows a relationship between a revolving speed of the electric motor and a lever command value. As mentioned above, the control valve strokes according to an amount of a lever operation. At the same time, the electric motor controllers 24 and 25 control revolving speed of the electric motors 13 and 14 in such a manner that the first and second electric motors 13 and 14 rotate at revolving speed or revolutions corresponding to the amount of lever operations, whereby the first and second hydraulic pumps 15 and 16 are controlled to discharge at flow rate proportional to the number of revolutions of these motors. The electric motor controller 26 controls the revolving speed of the rotation motor 17 such that the motor 17 rotates at the number of revolutions corresponding to the amount of lever operation.

That is, the control valve and the electric motors 13 and 14 (pumps 15 and 16) are simultaneously controlled by the lever operation. Under such simultaneous control, with the speed of each actuator being controlled, the electric motor for rotation 17 is controlled. Under this control, the rotating speed of the upper rotating body 2 is also controlled.

The first hydraulic pump 15 is used as a supply source of pressure oil to the arm cylinder 7 and the hydraulic motor for left traveling 20, while the second hydraulic pump 16 as a supply source of pressure oil to the hydraulic motor for right traveling 21, the boom cylinder 6, and the bucket cylinder 8.

Both electric motors 13 and 14 have the same capacity to each other, while both pumps 15 and 16 also the same capacity to each other. Further, the first hydraulic pump 15 is used as a supply source of merge oil to speed up the boom cylinder 6, and the second hydraulic pump 16 as a supply source of merge oil to speed up the arm cylinder 7. For this reason, one actuator can be driven by a plurality of electric motors 13 and 14 (pumps 15 and 16).

In addition to both the first and second electric motors 13 and 14, there are provided a third electric motor for control 38 (denoted at M3) and a third hydraulic pump 39 (denoted at P3) for driving a parking brake for rotation and traveling, which is not shown, and for supplying hydraulic pilot pressure to the control valve.

The hydraulic pressure provided by the third hydraulic pump 39 is stored in an accumulator 41 and then used. When storage of pressure in the accumulator 41 is finished, this state is detected by a pressure sensor 42, so that the third electric motor 38 is stopped via the controller 33. An electric motor controller 40 for the third motor 38 receives a command signal c from the controller 33 to work.

Figure 4:
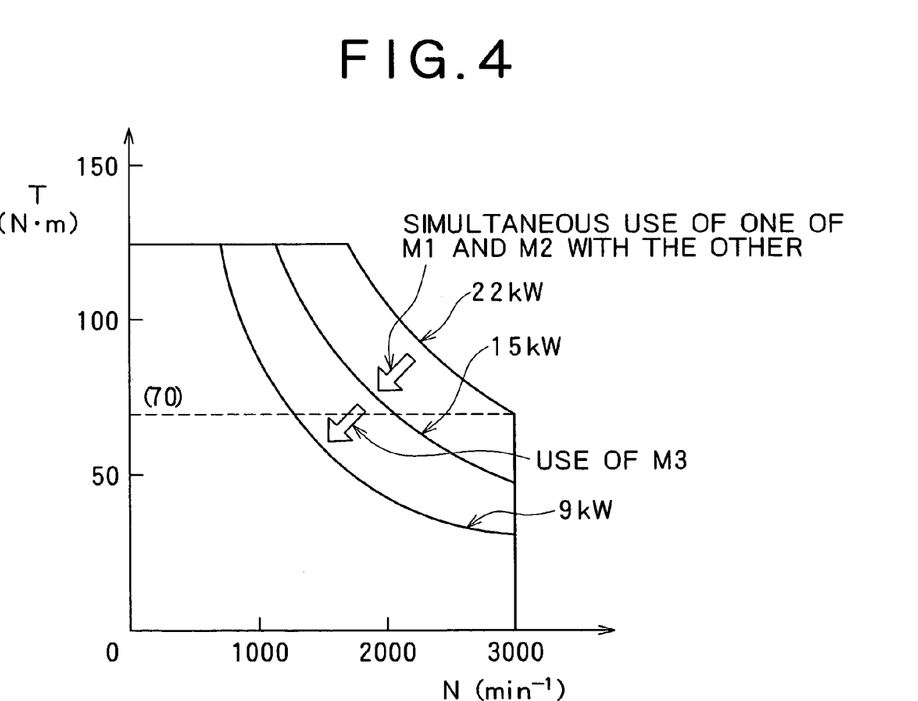
FIG. 4 is a diagram showing electric motor characteristics of first and second electric motors.
Figure 5:
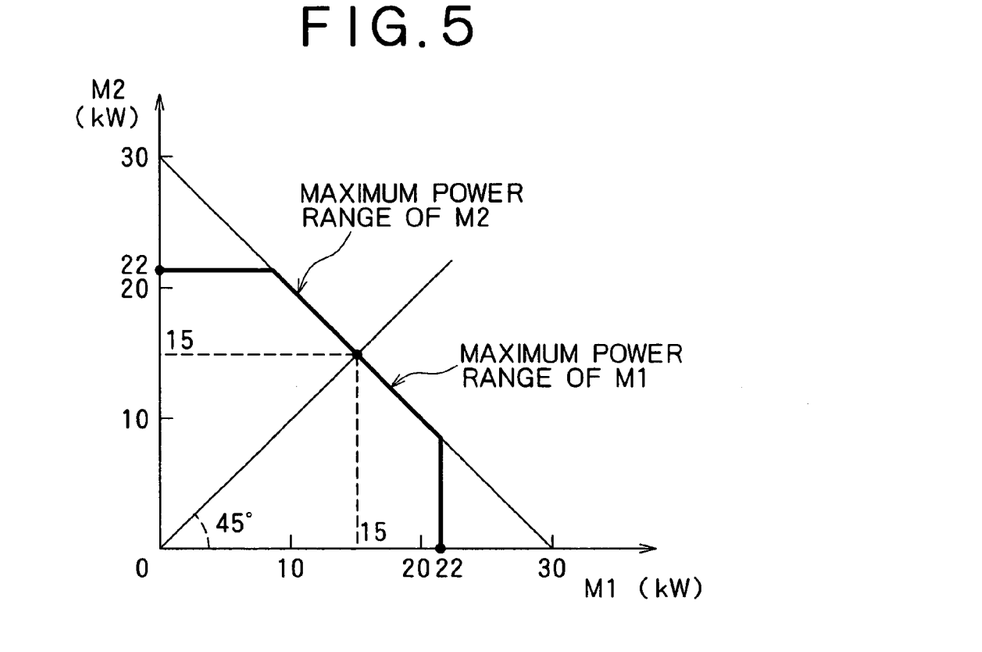
FIG. 5 is a diagram showing a relationship between maximum working power of the first electric motor and that of the second electric motor.

FIG. 4 shows motor characteristics of the first and second electric motors, and FIG. 5 does a relationship between maximum working power of the first motor and that of the second motor. Now, the operation of each electric motor according to the present invention will be explained with reference to these figures.

Suppose that the maximum capacity of the power supply mounted on the excavator is 33 kW. A breakdown of the capacity: 18 kW output from the power generator 11; and 15 kW output from the battery 12. As shown in FIGS. 4 and 5, under control of the electric motor controllers 24, 25 and 40, the power of the third motor 38 is 3 kW, while each of first motor 13 and second motor 14 has the maximum power of 22 kW when it is solely used. This maximum power of 22 kW is equivalent to a predetermined rated output which includes output corresponding to e.g., effective torque or the like. When both the motors 13 and 14 are simultaneously used, the total power of up to 30 kW can be consumed, and these motors are controlled in such a manner that the maximum power of the respective motors 13 and 14 is not individually less than 15 kW. This maximum power of 15 kW sets a limit to the power generated by the corresponding motor so that all the actuators to be operable may be actuated in multiple operations.

For instance, when the first electric motor 13 is used under a condition of "50 Nm torque×1000 min$^{-1}$ speed", the power of the first electric motor 13 is 5.2 kW. At this time, the power of the second motor 14 is calculated as follows: 30−5.2=24.8 kW>22 kW. Accordingly, the second motor 14 can be used up to the maximum power of 22 kW. When the first electric motor 13 is used under a condition of "50 Nm torque×2000 min$^{-1}$ speed", the power of the first electric motor 13 is 10.5 kW. At this time, the second motor 14 can be used up to the maximum power of 19.5 kW. Further, when the first electric motor 13 is used under a condition of "50 Nm torque×3000 min$^{-1}$ speed", the power of the first electric motor 13 is 15.7 kW. At this time, if the power being used by the second motor 14 is equal to or more than 14.3 kW, the first motor 13 cannot increase its speed up to a designated value, so that it reaches only a speed of up to 2870 min$^{-1}$ corresponding to the maximum power of 15 kW.

Therefore, when the first electric motor 13 is solely used, and for example, when the arm cylinder 7 is driven, the first electric motor 13 can be used up to the power up to 22 kW in a high-speed condition with respect to load torque, thereby improving working efficiency. Further, when the second electric motor 14 is simultaneously used altogether with the first electric motor 13, and for example, the boom cylinder 6 is driven, the total of power used in the arm cylinder 7 and the boom cylinder 6 is 30 kW, and the maximum power of each of the first and second electric motors 13 and 14 is controlled so as not to be under 15 kW. As a result, the power to be used is distributed among cylinders in balance, thereby efficiently carrying out excavating work of earth and sand.

Thus, according to the first embodiment, the total amount of power generated by the plurality of electric motors is defined by the maximum capacity of the power supply, thereby avoiding consumption of excessive power with respect to combination of respective peaks of the power for the motors. Especially, in the hybrid working machine such as that disclosed in the first embodiment, the capacity of a power source of the machine is stabilized, whereby power fluctuations are reduced. Even when downsizing each electric motor, power is distributed among the motors in balance within the maximum capacity of the power supply, preventing excessive loads on the electric motors, thus avoiding an unexpected stop of the motor, and a waste of power. In addition, the maximum capacity of the power supply of the working machine is predefined, whereby there is no need to prepare an excessive power supply, to permit saving of power supply costs and of a setting space to accommodate the power supply therein. Further, this has the big advantage that, by mounting the power supply on the self-traveling type machine in which its weight and a setting space to accommodate devices are strictly limited, an area for working in the working machine is enlarged.

Figure 6:
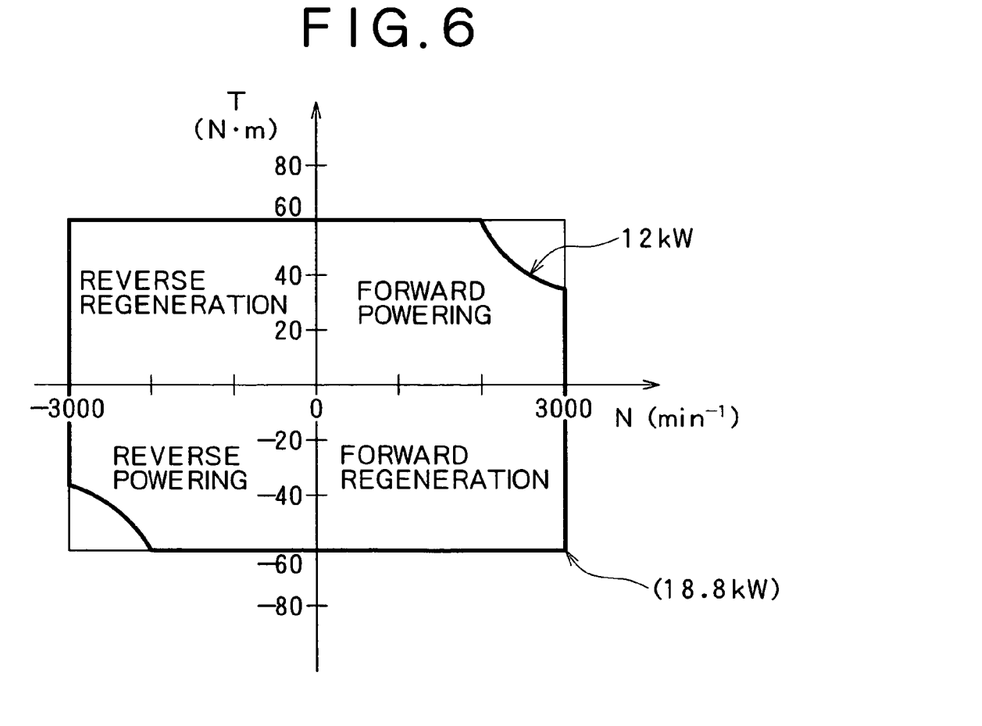
FIG. 6 is a diagram showing characteristics of an electric motor for rotation.

FIG. 6 shows the characteristics of electric motors for rotation in four quadrant regions. In FIG. 6, the maximum revolving speed of the rotation electric motor 17 is ±3000 min$^{-1}$, the maximum driving torque 60 Nm, and power in power running 12 kW. During braking, the maximum torque can be output until the maximum speed is reached. It should be noted that the maximum power of the rotation electric motor 17 may be switched to a predetermined value by the electric motor controller 26, depending on working conditions.

Figure 7:
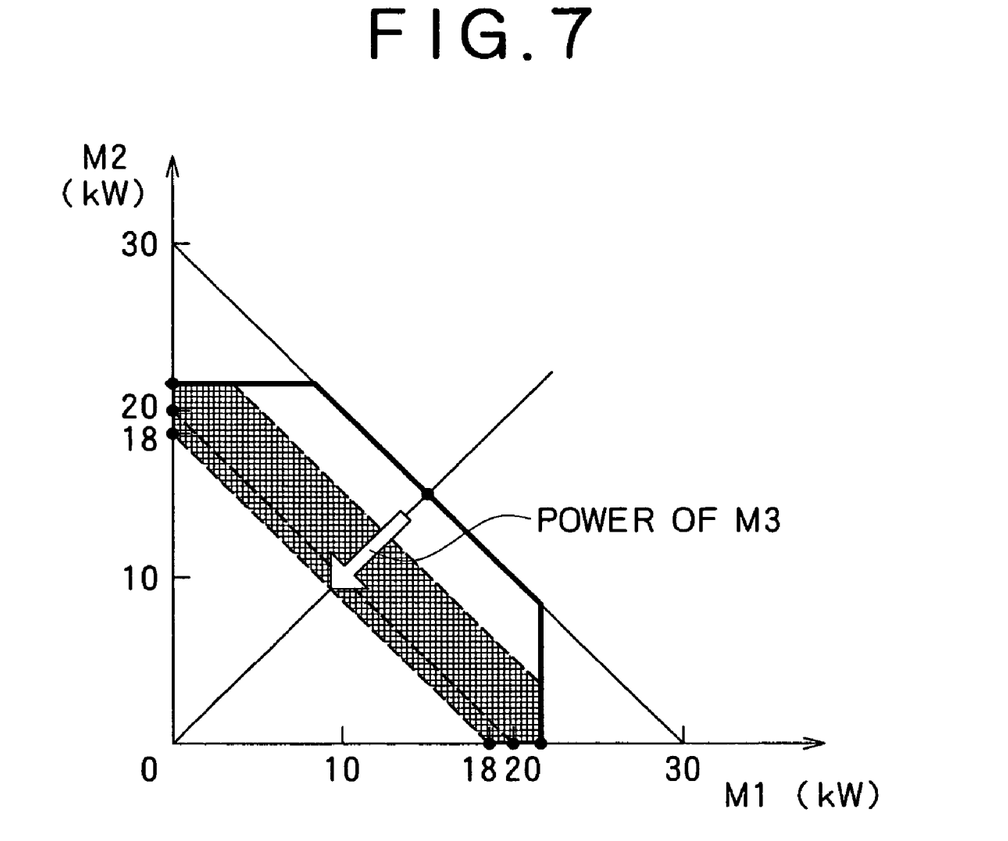
FIG. 7 is a diagram showing a relationship between the maximum working power of the first motor and that of the second motor in the case of using a third electric motor.

FIG. 7 shows motor characteristics of the electric motor in the case of using a third electric motor. In using the third motor 38, as shown in FIG. 7, the electric motor controllers 24 and 25 decrease the maximum power of the first and second electric motors 13 and 14 only by power used in the third motor 38 (predetermined power). For this reason, even when one electric motor such as the third motor 38 whose output is predefined is given a high priority, the power is distributed in balance among both electric motors 13 and 14, resulting in good control condition.

To give a comparison with the first embodiment, characteristics of a motor and a pump in a typical motor-operated hydraulic actuator driving device have been estimated as follows.

Figure 12A:
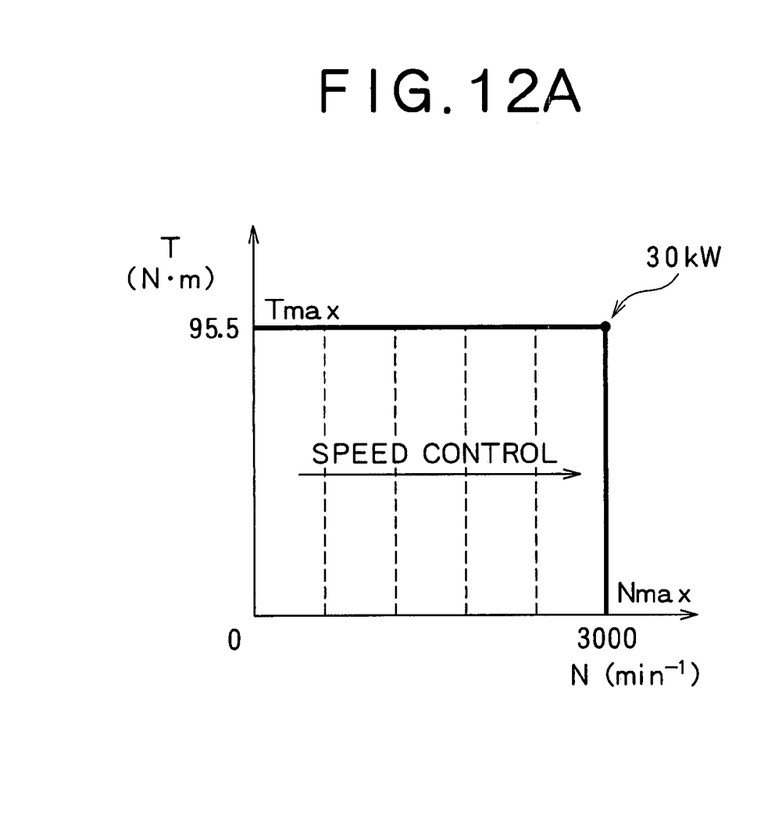
FIGS. 12A and 12B are diagrams showing estimated characteristics of an electric motor and a pump 13B in a typical motor-operated hydraulic driving device, respectively; and, FIGS. 13A and 13B are diagrams showing characteristics of the electric motor and the pump when carrying out output restriction of the electric motor of FIG. 12, respectively.
Figure 12B:
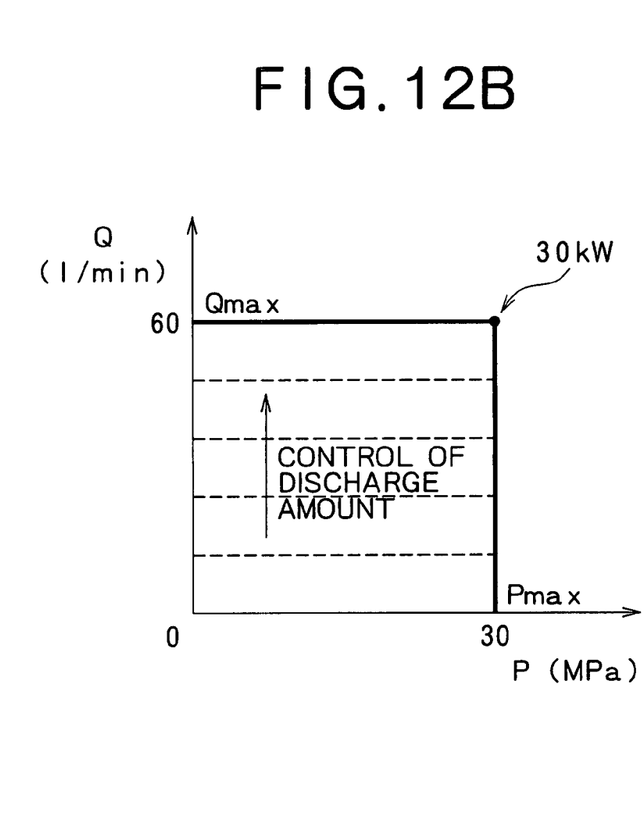

Generally, the motor-operated hydraulic actuator device is of normal fixed capacity type as a hydraulic pump. The relationship between characteristics of the motor and the pump is estimated, for example, as shown in FIGS. 12A and 12B. That is, FIG. 12A demonstrates as the characteristic of the electric motor that an arbitrary revolution N (min$^{-1}$) can be taken with respect to the output torque T (Nm), which is so-called speed control is conducted. FIG. 12B demonstrates as the characteristic of the pump that an arbitrary amount of discharge Q (L/min) can be taken with respect to a discharge pressure P (MPa), which is so-called discharge amount control. When the hydraulic pump is successively used under condition of 30 MPa and 60 L/min as shown in FIG. 12B, an electric motor whose rating is 30 kW (=3000 min$^{-1}$×2π/60×96.5 Nm×10$^{-3}$) is required as shown in FIG. 12A, leading to increase in size of the motor and required power supply capacity. Here, for brief explanation, efficiency is defined as equal to 1.

Figure 13A:
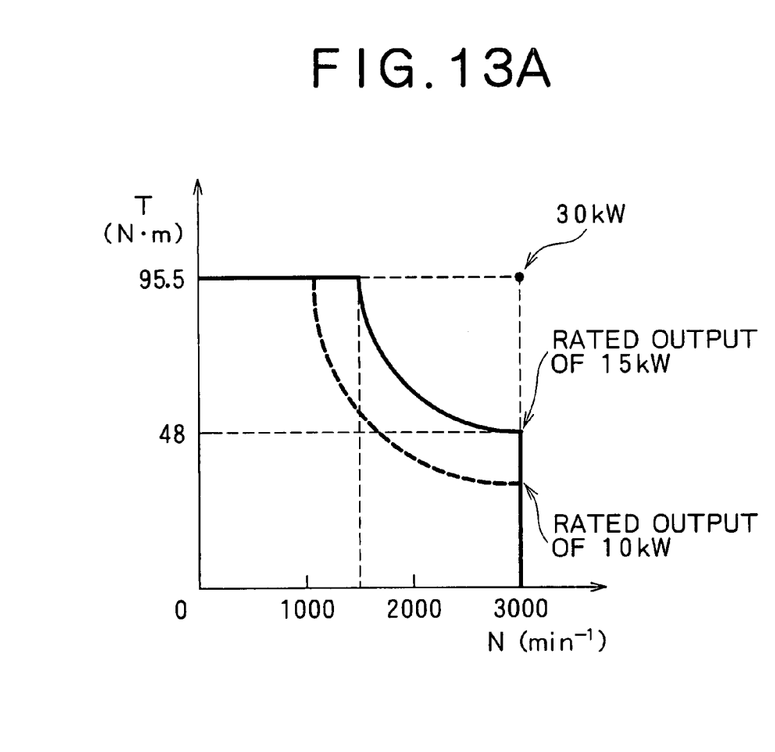

Accordingly, those skilled in the art would consider that by restricting output from the electric motor (generated power) in order to downsize the electric motor or power supply capacity, the characteristic of the electric motor such as that shown in a solid line of FIG. 13A will be obtained. For example, in a case where rated output of the motor is reduced to a half of the above value, namely, 15 kW, the electric motor may have been operated at rated torque of 48 Nm until the revolution of 3000 min$^{-1}$ is reached.

Figure 13B:
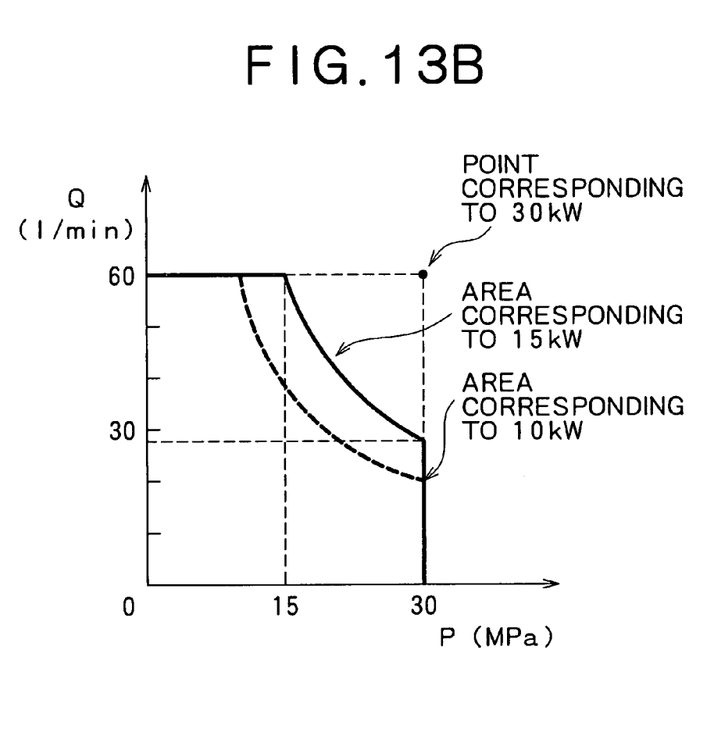

However, at bigger torque than the rated one, protection characteristic of the controller against excessive loads restricts working time of the motor. For example, at 200% of the rated torque (=95.5 Nm), working time in rotation of the motor is 30 sec. Although the pump itself is in the form of fixed capacity, whose discharge pressure and discharge amount are controlled based on the character of the electric motor, has the pump characteristic such as that shown by a solid line in FIG. 13B. Further, in a case where an electric motor is downsized to have one third of the above rated torque, namely, 10 kW torque, it has its electric motor characteristic such as that shown by a dotted line in FIG. 13A, thus reducing its size, with the maximum torque being 300% of the rated one, at which its continuous working time is above 1 sec. In this case, a pump characteristic such as that shown by a dotted line in FIG. 13B will be obtained.

Although such design permits downsizing of the motor and the power supply capacity with a fixed capacity type pump being usable, which results in affordable price, a continuous working time is restricted in a state where pressure of a hydraulic system is high. Accordingly, this has the same problems as a conventional motor-operated actuator driving device.

According to the first embodiment, the foregoing problems are to be solved, and there is provided the actuator driving device of a working machine capable of obtaining long working time with high thrust and high torque without any increase in size of an electric motor and a power supply capacity.

(b) Embodiment 2

Figure 8:
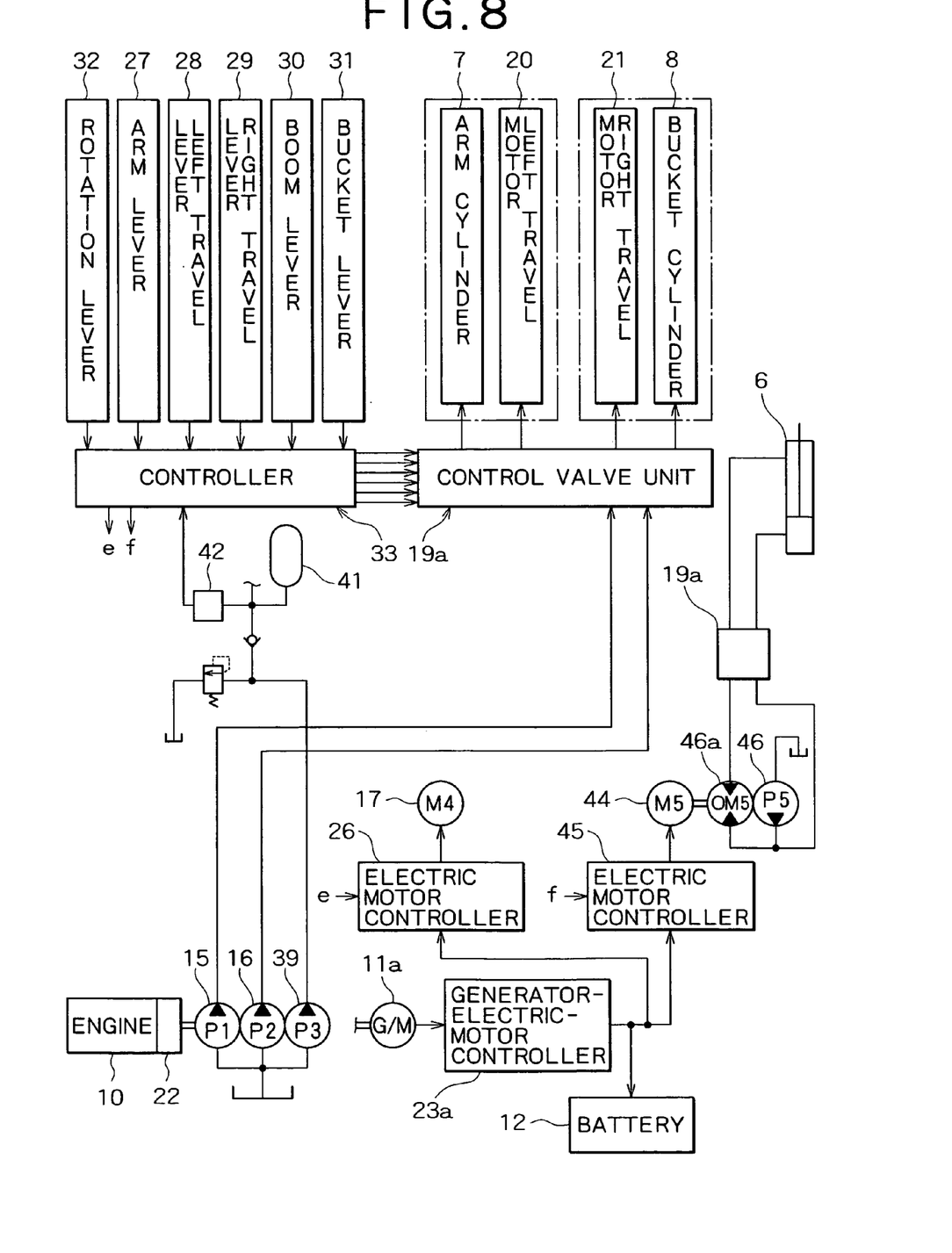
FIG. 8 is a block diagram showing the configuration of driving and control systems of a hydraulic excavator according to the second embodiment of the invention.

FIG. 8 shows the configuration of driving and control systems of a hydraulic excavator according to the second embodiment of the invention. In the figure, elements that are in common to the first embodiment are given the same reference characters, and thus explanation thereof will be omitted.

As shown in FIG. 8, a generator-electric-motor 11a and first, second, and third hydraulic pumps 15, 16, and 39 (in the figure, which are denoted at P1, P2, and P3, respectively) are altogether connected to an output shaft of the engine 10. It is noted that a boom and a rotating element are individually driven. That is, a boom cylinder for boom riding/falling 6 is operated by pressure oil supplied from a hydraulic motor for the boom 46a (denoted at OM5) which is driven by an electric motor for the boom 44 (denoted at M5). This pressure oil is supplied from a hydraulic pump for the boom 46 (denoted at P5) driven by the boom electric motor 44. The controller 33 outputs operation signals to the exclusive control valve 19a based on command signals corresponding to operation amount of the operating levers 33, while sending a revolution command signal f to the boom electric motor 44 (electric motor controller 45). The rotating element in this embodiment has the same structure as that in the above-mentioned first embodiment.

Some surplus power of electric power generated by the generator-electric-motor 11a with respect to the power required in working is converted into direct-current power by the generator-electric-motor controller 23a, which is then stored in the battery 12. If necessary, the power stored in the battery 12 is used as an electric motor power source.

Now, output from the engine 10 is 20 kW, while capability of the generator-electric-motor 11a is 20 kW. Output from the first and second hydraulic pumps 15 and 16 among hydraulic pumps is 30 kW, one from the third hydraulic pump 39 is 3 kW, one from the electric motor for the boom 44 is 30 kW, and one from the electric motor for rotation 17 is 12 kW. Output from the generator-electric-motor 11a when it is supplied with electric power by the battery 12 to perform an electric motor function is 10 kW in a steady state. At this time, output from the engine 10 is 20 kW. The peak output from the generator-electric-motor 11a is 20 kW.

Figure 9:
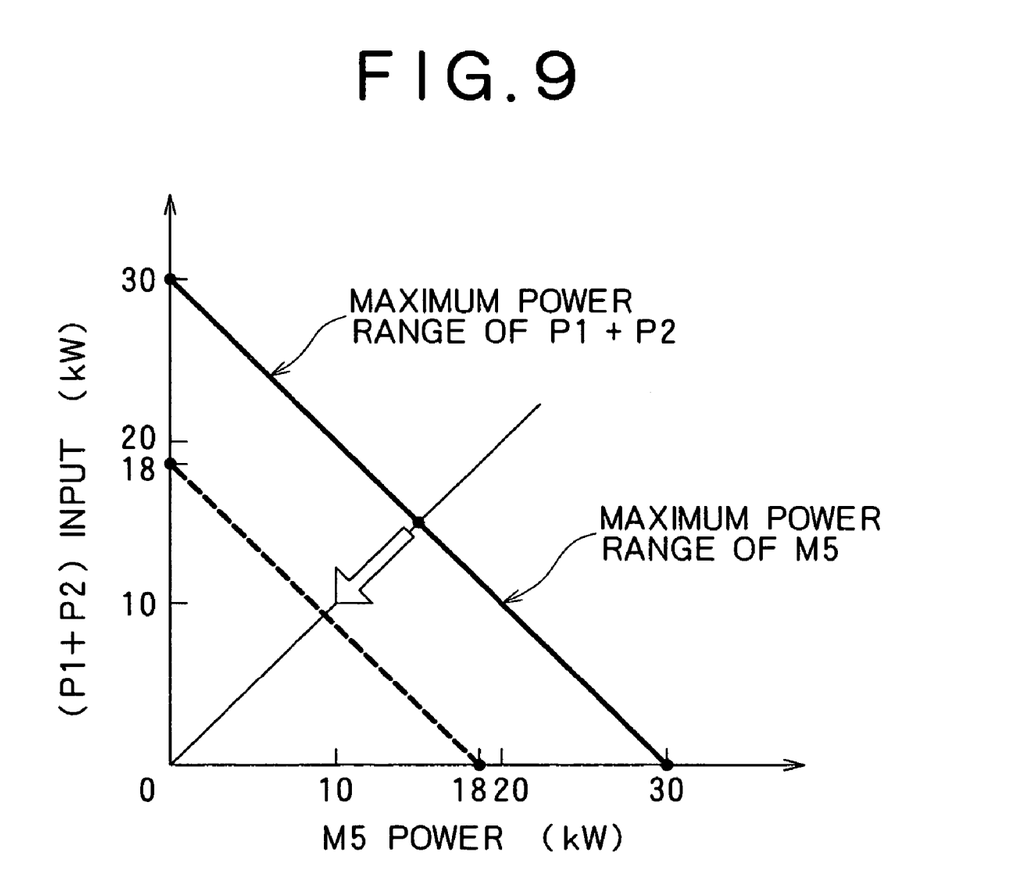
FIG. 9 is a diagram showing a relationship between maximum working power of an electric motor for a boom and that of the first and second hydraulic pumps.

The basic relationship between power of the electric motors in this embodiment is the same as that in the first embodiment. It should be noted that the ratio of the power of the electric motor for the boom 44 to that of the first and second hydraulic pumps 15 and 16 will be appropriately set. In cases where both the power of the boom motor and that of the pumps are the same to each other, the relationship therebetween is shown in FIG. 9. Although the relationship between electric motor for boom 44 and the electric motor for rotation 17 is the same as that of the first embodiment, it may be controlled by changing weights assigned to the electric motor for boom 44 and the first and second pumps 15 and 16.

According to the second embodiment, in the same way as the first embodiment, even if a plurality of electric motors are downsized, the total of power thereof does not exceed the power supply capacity, and such power is distributed in balance within the range of power supply capacity, thereby preventing excessive loads on the electric motors, thus avoiding an unexpected stop of the electric motor, and a waste of power.

Preferably, in the second embodiment, the revolving speed of the engine 10 is basically held constant, and the first and second hydraulic pumps 15 and 16 are controlled to have constant power as a variable capacity pump. Since the boom cylinder 6 can be controlled by the electric motor for the boom 44 and by the hydraulic motor for the boom 46*a* so as to have constant power, the hydraulic pump for the boom 46 may be of either fixed capacity type or variable capacity one.

(c) Embodiment 3

Figure 10A:
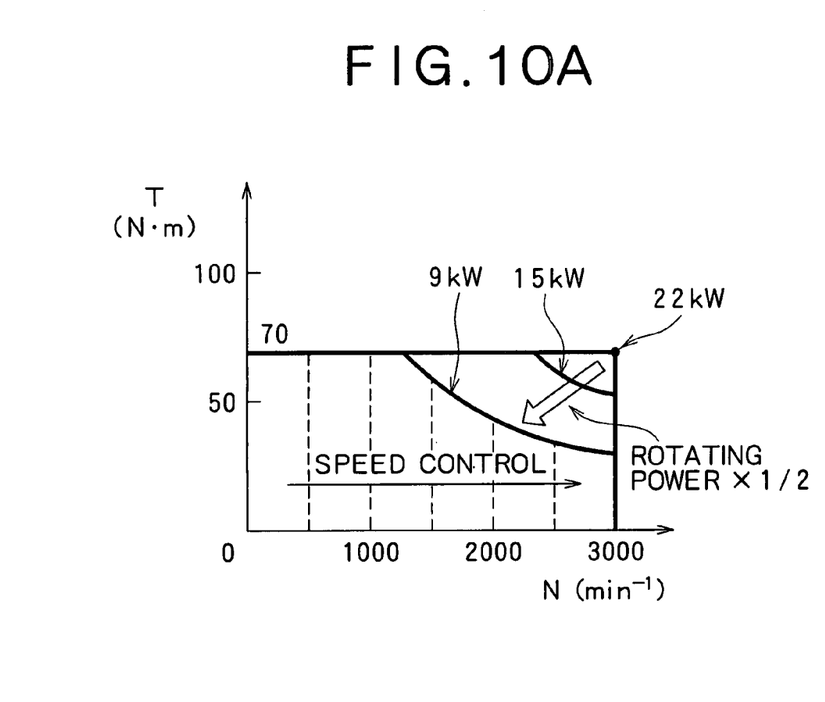
FIGS. 10A and 10B show characteristics of the electric motor and the pump according to the third embodiment of the invention, respectively.
Figure 10B:
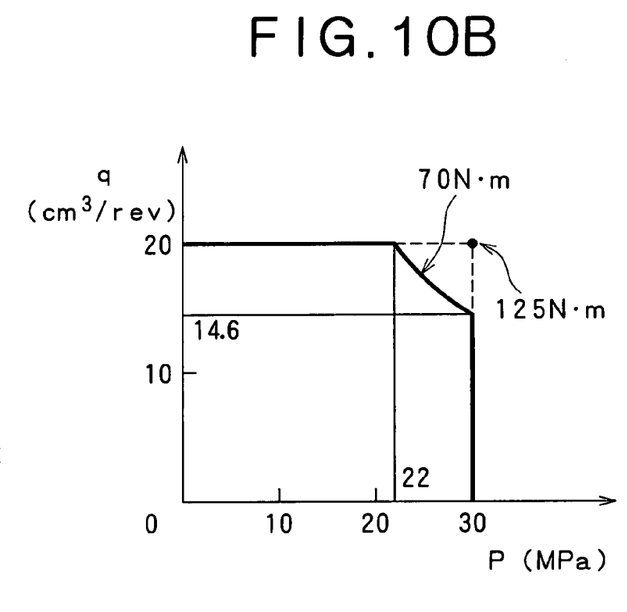

The third embodiment is constituted by replacing the pump of the first embodiment with a variable capacity type one. FIG. 10 shows electric motor and pump characteristics of a hydraulic excavator according to the third embodiment.

Figure 11:
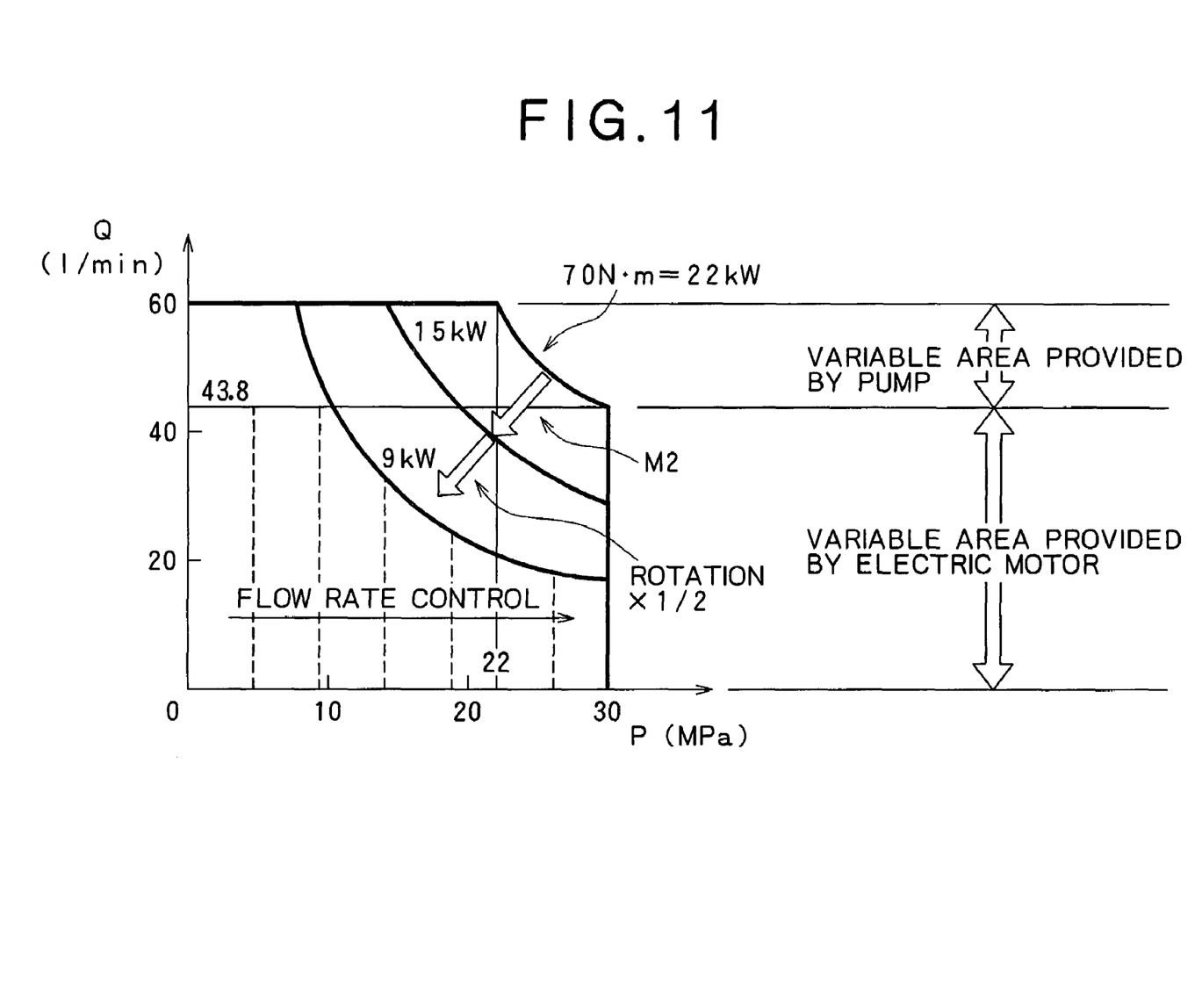
FIG. 11 is a diagram showing characteristics of a combination system of the electric motor and the pump of FIG. 10.

As shown in FIGS. 10A and 10B, the first and second electric motors 13 and 14 have the maximum power of 3000 min$^{-1}$×70 Nm=22 kW as a predetermined rated output. The first and second hydraulic pumps 15 and 16 are controlled to have the following constant values: capacity q of 20 cm$^3$/rev; a maximum pressure of 30 MPa; and a torque of 70 Nm. The combination of the electric motor and the pump provides a graph indicating a relationship between pressure and flow rate, such as that shown in FIG. 11. By controlling the revolving speeds of the first and second electric motors 13 and 14 by an operator's manipulation, amount of discharge of the first and second pumps 15 and 16 is controlled.

The first and second hydraulic pumps 15 and 16 are in the form of variable capacity, and are controlled to have constant torque, so that the maximum torque of the first and second electric motors 13 and 14 is reduced from 125 Nm to 70 Nm. Output relationship between the first and second electric motors 13 and 14, and power relationship between these motors and the electric motor for rotation 17 are based on power control performed by the electric motor controllers 24, 25, and 26, in the same way as the first embodiment.

That is, in the third embodiment, the first and second hydraulic pumps 15 and 16 are in the form of variable capacity. And under control of the electric motor controllers 24 and 25, revolving speeds of both the first and second electric motors 13 and 14 are restricted depending on output torque from the electric motors 13 and 14, so that power generated by the respective electric motors 13 and 14 is controlled. Additionally, the amount of discharge from the first and second hydraulic pumps 15 and 16 is reduced with respect to discharge pressure of the first and second hydraulic pumps 15 and 16 so that the power of each of the electric motors 13 and 14 does not exceed at least its maximum power, whereby driving torque of the first and second hydraulic pumps 15 and 16 is controlled. Even if each electric motor 13, 14 has constant output, the first and second hydraulic pumps 15 and 16 can ensure required discharge pressure, so that loads on the electric motors are reduced, thereby achieving energy saving.

In this embodiment, output from the first and second electric motors 13 and 14 is the same as that of the first embodiment. However, since torque of the motors in this embodiment is smaller than that of the first embodiment, a downsized motor can be utilized, and also its current value is smaller. In general, the use of such a downsized motor with a high load ratio is more effective than that of a large-sized electric motor with a low load ratio. Accordingly, compared with the case of using the large-sized electric motor with the low load ratio, the use of the downsized electric motor with high load ratio enables improvement in efficiency. It should be noted that the load ratio is obtained by the following formula: Load Ratio=Load Power/Rated Power.

When multiple operations are performed by the electric motor for rotation 17, and by the cylinders 6, 7, etc., driven through use of pressure oil which has been supplied from the first and second hydraulic pumps 15 and 16 driven by the first and second electric motors 13 and 14, widening of limits of output from both motors 13 and 14 without changing limits of driving torque of both pumps 15 and 16, with torque restriction carried out by the first and second hydraulic pumps 15 and 16, decreases output from the first and second electric motors 13 and 14, and permits use of them under a continuous rated condition. Thus, even when the pump discharge pressure is high, available continuous working time is not restricted.

Further, as a variable capacity pump has higher capacity, it is more effective. (That is, power efficiency is better.) If all control of power is performed by use of the pumps, not by the electric motor, the pumps are used within smaller capacity, leading to reduction in efficiency.

It should be noted that in the above embodiments 1 to 3, pressure oil is used as working liquid, the first and second hydraulic pumps 15 and 16 as a corresponding hydraulic pump, and a hydraulic cylinder or motor as a hydraulic actuator. As the working liquid, another liquid, e.g., water or the like may be used.

Although in the above embodiments 1 to 3, the engine 10 is used as a prime motor, a gas turbine or a fuel battery may be used instead. Further, an electric double layer capacitor (that kind of capacitor such as brand name: ultracapacitor) may be used as a power storage means instead of the battery 12. Otherwise such a capacitor and the battery may be combined.

In the above embodiments 1 to 3, rotating operation is performed by driving the electric motor. However, another actuator can be driven by the electric motor. Moreover, in the above embodiment 2, boom operation is performed by electric/hydraulic driving, but another actuator may be operated by electric/hydraulic driving.

In the above embodiments 1 to 3, a hybrid machine having an engine, a generator (generator-electric-motor), and a battery mounted thereon as a working machine has been described. Instead of this machine, a non-hybrid machine having e.g., only a battery may be used. It should be noted that although the hydraulic excavator has been explained in the above as an example of working machine, the present invention is not limited thereto. It would be apparent that the present invention may be applied to another working machine, such as a crawler crane, a wheel crane, or the like in the same way.

INDUSTRIAL APPLICABILITY

As will be seen from the above descriptions, the present invention is useful in an actuator driving device for actuating a plurality of actuators by a plurality of electric motors mounted on a working machine, such as a hydraulic excavator, a mobile crane, or the like. In particular, the invention is suitable for use in an actuator driving device mounted on the so-called hybrid working machine, which has a prime motor and a generator mounted thereon as a power system.

The invention claimed is:

1. An actuator driving device of a working machine, which is mounted on the working machine, for allowing electric motors to generate power by using electric power supplied from a power supply with a predetermined maximum capacity, and for driving actuators by the generated power, the actuator driving device is characterized by comprising:

a controller for controlling the power generated from each of said electric motors so that, during operation of the working machine, the power generated from each of the electric motors is equal to or less than a predetermined rated output of the respective motor, and that a total amount of power simultaneously generated by said electric motors corresponds to the predetermined maximum capacity of said power supply.

2. The actuator driving device of the working machine according to claim 1, wherein the controller allows one of the electric motors to generate a predetermined power, and to control the power generated from the other electric motor within a remaining capacity obtained by subtracting said predetermined power from the predetermined maximum capacity of said power supply.

3. The actuator driving device of the working machine according to claim 1, wherein the controller respectively controls the power generated from each of said electric motors so that, in multiple operation of the actuators to be driven, all the actuators are actuated in balance.

4. The actuator driving device of the working machine according to claim 2, wherein the controller respectively controls the power generated from each of said electric motors so that, in multiple operation of the actuators to be driven, all the actuators are actuated in balance.

5. The actuator driving device of the working machine according to claim 1, wherein the working machine is a self-traveling working machine, and said power supply is mounted on the working machine.

6. The actuator driving device of the working machine according to claim 1, wherein at least one of the electric motors drives a hydraulic pump, and the hydraulic pump drives at least one of the actuators.

7. The actuator driving device of the working machine according to claim 6, wherein said hydraulic pump is a variable capacity hydraulic pump, and wherein the controller controls the power generated by the electric motors by restricting a revolving speed of each of the electric motors in accordance with an output torque of the electric motors, and controls driving torque of the hydraulic pump by reducing an amount of discharge of the hydraulic pump with respect to a discharge pressure of the hydraulic pump so that the power of said electric motors does not exceed at least a maximum power thereof.

8. An actuator driving device of a working machine, which is mounted on the working machine, for allowing electric motors to generate power by using electric power supplied from a power supply with a predetermined maximum capacity, and for driving actuators by the generated power, the actuator driving device comprising:

means for controlling the power generated from each of said electric motors so that, during operation of the working machine, the power generated from each of the electric motors is equal to or less than a predetermined rated output of the respective motor, and means for controlling the power generated from each of said electric motors so that a total amount of power simultaneously generated by said electric motors corresponds to the predetermined maximum capacity of said power supply.

9. The actuator driving device of the working machine according to claim 8, wherein in multiple operation of the actuators to be driven, all the actuators are actuated in balance.

10. An actuator driving device of a working machine, comprising:

an electric motor;

a variable capacity pump driven by said electric motor;

an actuator driven by pressure of oil from said pump; and a controller adapted to control power generated by the electric motor by restricting a revolving speed of the electric motor in accordance with an output torque of the electric motor, wherein the pump is controlled to have a constant torque by controlling an amount of discharge of the pump with respect to discharge pressure of the pump so that power of the electric motor does not exceed a maximum power thereof.

* * * * *